United States Patent Office 2,793,360
Patented May 21, 1957

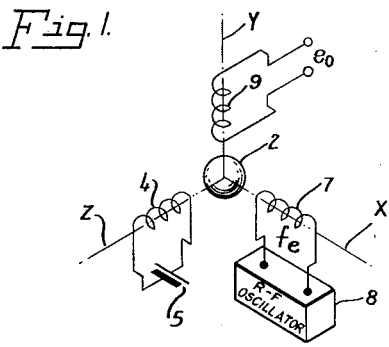
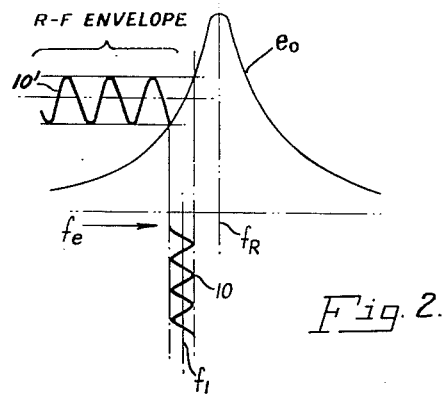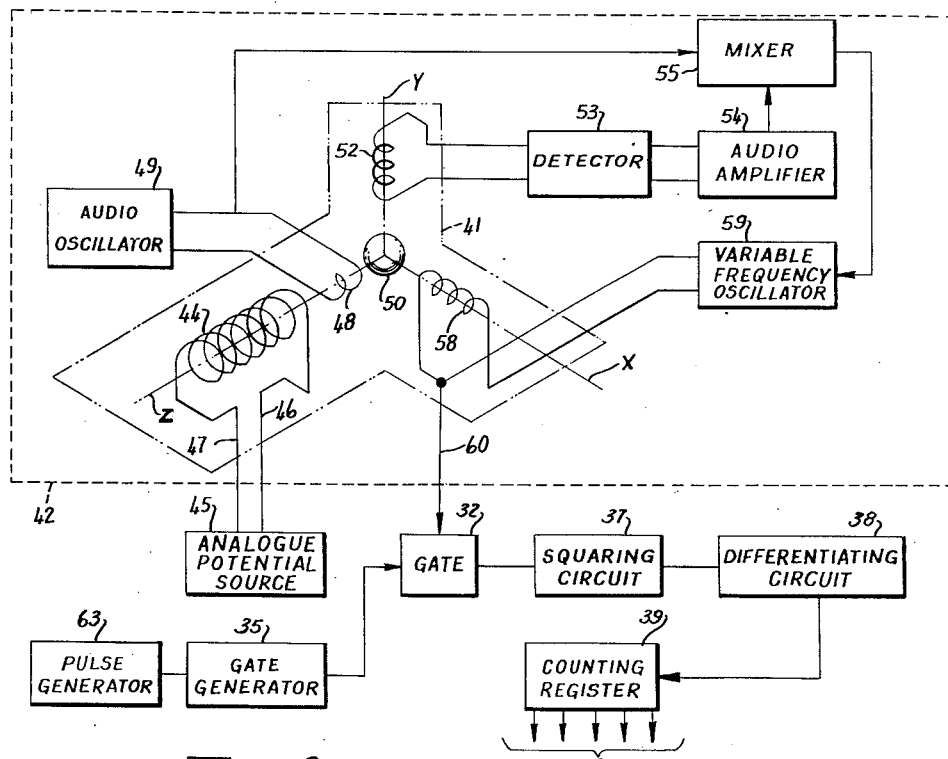
INVENTOR,
JAMES O. BEAUMONT

2,793,360

DEVICES EMPLOYING THE PRECESSION RESONANCE OF PARAMAGNETIC MEDIA

James O. Beaumont, Los Gatos, Calif., assignor to Hughes Aircraft Company, Culver City, Calif., a corporation of Delaware Original application May 31, 1951, Serial No. 229,184. Divided and this application September 13, 1955, Serial No. 534,057

5 Claims. (Cl. 340—347)

This invention relates to devices utilizing the Larmor precession resonant frequency of paramagnetic substances, and, more particularly, to devices which utilize the conversion of a given magnetic flux into a precise frequency related thereto by precession of nuclear and atomic moments of paramagnetic substances subjected to the flux field. This application is a division of U. S. patent application Serial No. 229,184 by James O. Beaumont, for "Devices Employing the Precession Resonance of Paramagnetic Media," filed May 31, 1951.

It has been found that the nuclei of paramagnetic materials possess proton or nuclear magnetic moments, and if these nuclei are subjected to a steady state magnetic flux field, the magnetic moments of the nuclei will orient in a direction parallel to the flux field. If the substances are then subjected to a magnetic force couple produced by a high frequency magnetic field directed at right angles to the steady state flux field, a precession of their nuclei takes place, similar in manner to the precession of a gyroscope. This precession may be converted into a signal by placing a pick-up or receiver coil at right angles to both the steady state flux field and the driving high frequency field. The frequency of the precession signal is always equal to the frequency of the driving magnetic force couple produced by the high frequency magnetic field, but the amplitude of the precession signal is a quantity determined by the material, the magnitude of the steady flux field intercepting the substance and the frequency and amplitude of the driving high frequency flux field. If, for example, the driving field frequency were varied while maintaining the steady flux field at a constant value, a resonance condition would be observed in the magnitude of the nuclear precession signal at a given driving frequency. If the flux field were then placed at a second constant value and the driving frequency once again varied, another resonance condition of precession magnitude would be observed, but at a different driving frequency than that observed in the first instance. This resonant frequency of the nuclear magnetic moments, termed the Larmor precession resonant frequency, has been determined to be directly proportional to the magnitude of the steady state flux field, and this proportionality is observable over a wide range of flux magnitudes.

Another resonant precession phenomenon similar to the nuclear induction noted above, is obtainable by utilizing the electron or atomic shell magnetic moments of a paramagnetic substance. The production of this atomic shell resonance is effected in the identical manner noted above except that the steady flux field necessary to observe the precession of the electron moments is of the order of only one-thousandths as much as is needed for a comparable couple undergoing nuclear induction. Another difference between atomic and nuclear induction is that the resonant frequency of atomic induction will possess substantially a million times greater signal-to-noise ratio than nuclear induction for a comparable sample. This much smaller flux field and greater signal-to-noise ratio make the utilization of electron resonance much more attractive than nuclear resonance in many applications serving to correlate the resonant precession frequency to flux magnitudes.

The resonant precession frequency of a paramagnetic substance, regardless of whether its nuclear or atomic magnetic moment is used for obtaining resonance, is an extremely stable one for any steady state constant flux value, since it is determined by the substantially invariant qualities and characteristics of nuclear and atomic structure. Inasmuch as it is possible to obtain a flux field directly proportional to the current passing through a coil, it is clear that by utilizing the principle of Larmor precession one may obtain a frequency exactly proportional to a given current or voltage.

This invention contemplates utilizing this factor of proportionality between potential and frequency of magnetic induction in a novel manner to accomplish, in its embodiment, an accuracy heretofore unknown in the art of potential-to-frequency conversion and frequency-to-potential conversion.

Utilization is made herein of the inherent stability of the voltage-to-frequency conversion property of nuclei or atomic magnetic induction to provide an extremely stable voltage suitable for use as a voltage standard. This voltage stability is primarily limited by the frequency stability of a radio-frequency oscillator, which, as is well known, may be made extremely stable.

It is, therefore, an object of this invention to provide devices which, by employing the precession resonance of either the nuclei or atomic magnetic moments of paramagnetic substances, provide an extremely accurate proportionality between current or potential and frequency.

A further object of this invention is to provide a device utilizing Larmor precession of paramagnetic substances to convert a given analogue potential quantity into a corresponding binary digital number.

Another object of this invention is to provide an analogue-to-digital converter which converts an analogue potential into an equivalent proportional resonant precession frequency of a paramagnetic substance, and then counts the cycles of the resonant frequency for a predetermined time interval to produce a digital number output corresponding to the analogue potential.

The novel features which are believed to be characteristic of the invention, both as to its organization and method of operation, together with further objects and advantages thereof, will be better understood from the following description considered in connection with the accompanying drawing in which one embodiment of the invention is illustrated by way of example. It is to be expressly understood, however, that the drawing is for the purpose of illustration and description only, and is not intended as a definition of the limits of the invention.

Fig. 1 is a schematic diagram of a simple magnetic induction unit;

Fig. 2 is a curve associated with Figs. 1 and 3;

Fig. 3 is a schematic diagram of an analogue-to-digital converter according to this invention.

Referring now to the drawing, there is shown in Fig. 1 a typical precession induction unit utilizing the Larmor precession frequency of a paramagnetic substance for obtaining a sharply resonant circuit. This unit is illustrated and described so that the principles observable in its operation will be apparent when it, in substance, is incorporated in the embodiments of this invention to be disclosed. The apparatus consists of a homogenous body 2 of paramagnetic material lying at the imaginary point of intersection of three mutually perpendicular axes, $x$, $y$, and $z$, respectively, which constitute a conventional representation of the three-dimensional rectangular coordinate system. A static field coil 4, whose axis is in alignment with the z-axis, is connected to a battery 5, and produces a constant and uniform flux field, parallel to the z-axis, which envelops body 2. This flux acts upon substance 2 in a manner such that the magnetic moments thereof tend to orientate themselves parallel to the lines of force of the flux pattern along the z-axis. A transmitter coil 7 is aligned along the x-axis and is coupled to a radio-frequency oscillator 8, the resultant radio-frequency magnetic driving field being directed at right angles to the flux lines produced by coil 4. Under this condition, the magnetic moments of paramagnetic body 2 will begin Larmor precession by reason of their being subjected to the force couple produced by the interaction of the two fields. This Larmor precession will produce a potential having the same frequency as the radio-frequency driving frequency of oscillator 8 across a receiver coil 9 whose axis is aligned along the y-axis. The relative magnitude of the potential output produced by coil 9, at any given instant, is a function of the steady state flux produced by coil 4 which envelops body 2, the radio-frequency output frequency of oscillator 8, the paramagnetic substance constituting body 2.

Referring now to Fig. 2, there is shown a waveform illustrating the magnetic resonance effect obtained by varying the output frequency of the radio-frequency oscillator 8 while maintaining a constant flux from coil 4. Voltage $e_0$, in Fig. 2, which is the output potential produced across coil 9, is the relative output potential of the device and indicates that the body 2 of paramagnetic material exhibits a definite precession resonant frequency at one point, $f_R$, of applied radio-frequency and one value of steady-state flux. This resonant frequency may be varied by changing the amount of steady-state flux applied across the paramagnetic material, the resulting change of resonant frequency being directly proportional to the change in flux, this proportionality being observable over a large flux range.

Fig. 3 discloses an analogue-to-digital converter utilizing the phenomenon of paramagnetic resonance for accomplishing the conversion. The precession induction unit 41, in this instance, consists of a coil 44 whose axis is aligned along the z-axis and which establishes a uniform flux field in the region of paramagnetic body 50 by reason of the current flowing through it from an analogue potential source 45. A subsidiary coil 48, whose axis is aligned with the axis of coil 44, is connected to audio frequency oscillator 49, and serves to weakly modulate the flux field enveloping paramagnetic body 50 from the main coil 44 with an audio frequency modulation envelope. The receiver coil 52, aligned along the y-axis is connected to a detector 53, whose output is amplified by an audio amplifier 54 and then fed into one input circuit of a mixer 55. A second input circuit of mixer 55 is connected to audio oscillator 49 and its output is connected to a variable frequency radio-frequency oscillator 59 to control the frequency of oscillation thereof. The output of radio-frequency oscillator 59 is connected to a transmitter coil 58 aligned along the x-axis and which serves to produce a driving field on the paramagnetic substance of body 50 to induce precession thereof.

Block 42, containing the elements thus far described, is, in effect, a self-controlled or locked-in oscillator operating at the Larmor resonant frequency at all times for all values of flux produced by coil 44. Its mode of operation is as follows:

The alternating flux field produced by coil 48 serves to amplitude modulate the total flux reaching body 50 from coil 44, and if the flux envelope is represented as curve 10 in Fig. 2, as applied to the resonant curve of the induction unit where the existing frequency of oscillator 59 is at a frequency corresponding to the average value of the curve 10, as indicated by $f_1$, then receiving coil 52 will have induced in it a modulated radio frequency potential as illustrated by curve 10' of Fig. 2, whose envelope is of the same audio frequency as that produced by oscillator 49. The magnitude and phase of curve 10' will vary in accordance with the point where curve 10 is applied on curve $e_0$ relative to the resonant frequency $f_R$, which, in turn, is determined by the output frequency $f_1$ of oscillator 59. After detection by detector 53 of the signal having the waveform 10' and amplification by audio amplifier 54, the signal is applied to mixer 55 along with a signal from audio oscillator 49. Mixer 55 is utilized as a phase discriminator and produces a direct-current frequency-difference potential on its output conductor which is a linear function of the amplitude of the signal from amplifier 54, the polarity of the potential being determined by the relative phase angle between the two input potentials to mixer 55. The direct-current output potential is then applied to the variable frequency radio-frequency oscillator 59 to control the frequency thereof. Oscillator 59 may be of the type having a reactance tube circuit determining the frequency of its oscillation, the reactance circuit being controlled by the input potential to thereby vary the output frequency. In the example illustrated in Fig. 2, the direct-current output from mixer 55 due to potential 10' will change the frequency output of oscillator 59 until a point on the curve $e_0$ is reached where curve 10 of the flux modulation envelope swings equally on either side of the frequency designated by $f_R$, which is the paramagnetic resonant frequency of substance 50 under the given field produced by coil 44. When this point on the curve is reached, a zero direct-current potential is produced by the mixer which does not further vary the frequency of oscillator 59. Under this condition, the frequency of oscillator 59 is set at the paramagnetic resonant frequency of body 50 for the given current in coil 44, and will automatically track in the manner explained to a new resonant frequency for any new current quantity flowing through coil 44. Unit 42 thus provides a self-tracking oscillator, which produces on an output conductor 60 coming from variable oscillator 59, a signal having a frequency directly proportional to the current flowing in leads 46 and 47 connected between the analogue potential source and coil 44.

The frequency of the output signal appearing on conductor 60 is counted for a predetermined time interval and the count thereof provides the analogue-to-digital conversion. The counting is accomplished by connecting conductor 60 to one input of a gate 32, the other input of gate 32 being connected to the output of a gate generator 35. The input of gate generator 35 is, in turn, connected to pulse generator 63, and, upon receipt of a pulse therefrom, produces a gating pulse lasting for the predetermined interval. This gating pulse opens gate 32 and allows the output signal from the tracking oscillator unit 42 to be passed therethrough. The signal is, in sequence, squared by a squaring circuit 37, differentiated by a differentiating circuit 38, and the resultant pulses applied to a counting register 39 of the type disclosed in Fig. 1. The final digital count is presented by the scale-of-two counter constituting counting register 39 on its output terminals 40 as a binary digital number corresponding to the potential output of source 45.

As will be apparent to those skilled in the art, the unit according to Fig. 3 may be modified so that beat or difference frequencies for counting are obtained between two similar self-tracking oscillators. In this manner, a higher precession resonance frequency may be employed by the self-tracking oscillators than that possible with the illustrated single oscillator if a conventional counter register is to be employed for presenting the digital output number.

What is claimed as new is:

1. In an analogue-to-digital converter, an oscillator unit comprising: a paramagnetic body; means for producing a static magnetic field having an audio-frequency magnetic modulation to envelop said body, the magnitude of said field being a function of the amplitude of an analogue signal to be converted; variable radio-frequency oscillator means for enveloping said body with a radio-frequency magnetic field to induce precession of said body, the precession of said body being amplitude modulated at the audio-frequency modulation rate of said static field; means positioned adjacent said body for producing a potential induced by the precession of said body; and means conductively coupled between the last-named means and said oscillator means and responsive to the amplitude and phase of the audio modulation of the precession of said body for controlling the frequency of said oscillator means to maintain the frequency of said oscillator means at the precession resonant frequency of said body as determined by the magnitude of said static field, whereby the frequency of the output signal from said oscillator means is directly proportional to the amplitude of the analogue signal.

2. In an analogue-to-digital converter, an oscillator unit for producing a signal whose frequency is proportional to the amplitude of an applied analogue signal, said unit comprising: a paramagnetic body; means responsive to the analogue signal for enveloping said body with a first magnetic field, the magnitude of said first field being proportional to the amplitude of the analogue signal; oscillator means for producing a variable frequency radio-frequency signal; means coupled to said oscillator means for enveloping said body with a radio-frequency magnetic field to induce precession of said body; and means responsive to the amplitude of the precession of said body for controlling the frequency of said oscillator means to maintain the frequency of said radio-frequency field at the precession resonant frequency of said body as determined by the magnitude of said first field, whereby the frequency of the radio-frequency signal from said oscillator means is directly proportional to the amplitude of the analogue signal.

3. The oscillator unit according to claim 2, having, in addition, normally inoperative counting means for digitally counting the number of cycles of a signal applied thereto; means for applying the radio-frequency signal from said oscillator means to said normally inoperative counting means; and means for rendering said normally inoperative counting means operable for a predetermined time interval, whereby the digital count of said counting means represents the digital equivalent of the amplitude of the applied analogue signal.

4. In an analogue-to-digital converter, an oscillator unit for producing an output signal having a frequency proportional to the amplitude of an applied analogue signal, said oscillator unit comprising: a paramagnetic body; means for enveloping said body with a static magnetic field, the magnitude of said field being proportional to the amplitude of the applied analogue signal; means for magnetically modulating said static field at an audio frequency by an auxiliary magnetic field; a radio-frequency oscillator, said oscillator producing an output signal whose frequency is determined by the magnitude and polarity of a direct-current signal applied thereto; means responsive to the output signal of said oscillator for applying a radio-frequency magnetic field to envelop said body in a direction at right angles to said static field for inducing precession of said body, said precession being amplitude modulated at the audio frequency of said auxiliary field; receiver means positioned adjacent said body, the precession of said body inducing an audio-modulated signal having the precession frequency of said body in said receiver means; means conductively coupled to said receiver means and said modulating means for mixing a first signal representing the audio component of the signal from said receiver means with a second signal representing the audio-frequency modulation of said static magnetic field to produce a direct-current output signal whose magnitude is determined by the magnitude of said first signal, and whose polarity is determined by the phase difference between said first and second signals; and means for applying the output signal from the last-named means to said radio-frequency oscillator to vary the frequency of the output signal from said oscillator until the frequency of said signal coincides with the resonant precession frequency of said body under influence of said static magnetic field.

5. The combination defined in claim 4 which also includes frequency counting means for counting the number of cycles of a signal applied thereto and presenting the count in digital form; and means for applying the output signal from said radio-frequency oscillator to said frequency counting means for a predetermined time interval, the count of said counting means representing the digital conversion of the applied analogue signal.

No references cited.